United States Patent [19]

Reinecke

[11] 4,300,805
[45] Nov. 17, 1981

[54] DUAL-CIRCUIT PRESSURE MEDIUM OPERATED BRAKING SYSTEM LOAD-DEPENDINGLY CONTROLLED FOR MOTOR VEHICLES

[75] Inventor: Erich Reinecke, Burgdorf, Fed. Rep. of Germany

[73] Assignee: WABCO Fahrzeugbremsen GmbH, Hanover, Fed. Rep. of Germany

[21] Appl. No.: 110,586

[22] Filed: Jan. 9, 1980

[30] Foreign Application Priority Data

Feb. 26, 1979 [DE] Fed. Rep. of Germany ....... 2907426

[51] Int. Cl.³ ............................................. B60T 8/22
[52] U.S. Cl. ................................. 303/22 R; 303/66; 303/40
[58] Field of Search .................... 303/2, 6 C, 7, 22 R, 303/40, 54

[56] References Cited
U.S. PATENT DOCUMENTS

| 3,227,494 | 1/1966 | Alfieri | 303/40 |
| 3,525,555 | 8/1970 | Meyer et al. | 303/40 |
| 3,614,170 | 10/1971 | Page | 303/40 |
| 4,109,969 | 8/1978 | Reinecke | 303/22 R |
| 4,116,492 | 9/1978 | Reinecke | 303/22 R |

Primary Examiner—Duane A. Reger
Attorney, Agent, or Firm—G. J. Falce

[57] ABSTRACT

A dual-circuit, hydropneumatic brake conytrol system having a load proportioning function wherein the load condition sensed at the rear axle establishes the braking level at both axles. The front axle brake control is adjusted through either a pneumatic or hydraulic connection with the rear axle load control device. By making the operator's brake valve hydraulic, it can be isolated from the remaining hydraulic and pneumatic brake control components, in order to minimize the amount of space required in the operator's cab to accommodate the brake valve.

9 Claims, 4 Drawing Figures

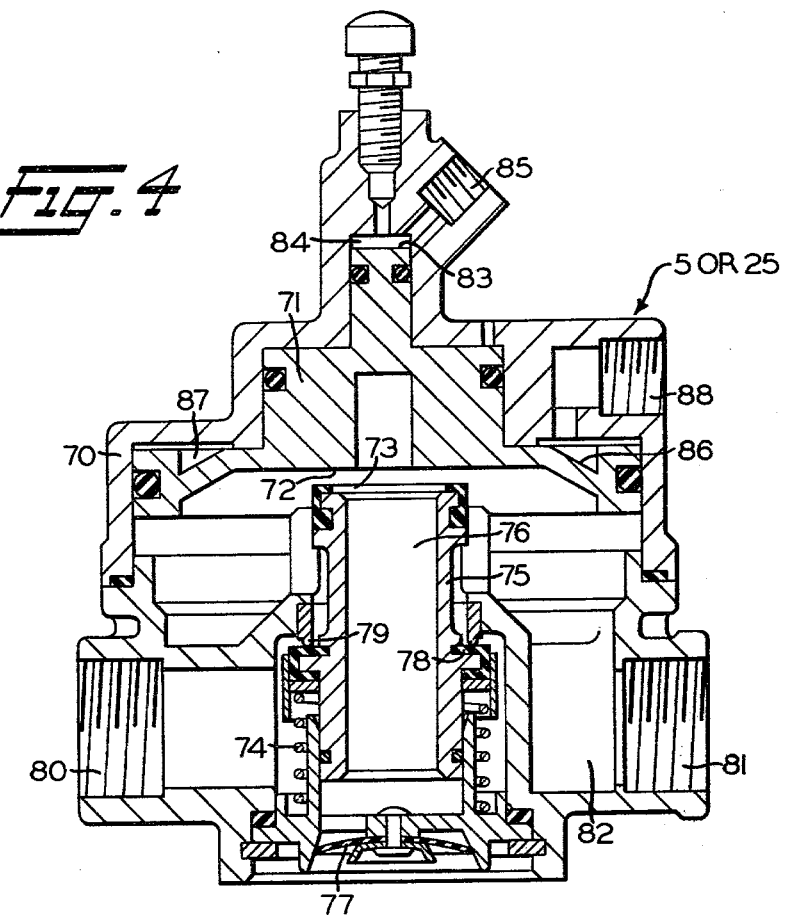

DUAL-CIRCUIT PRESSURE MEDIUM OPERATED BRAKING SYSTEM LOAD-DEPENDINGLY CONTROLLED FOR MOTOR VEHICLES

BACKGROUND OF THE INVENTION

The invention concerns dual-circuit, fluid pressure braking systems for motor vehicles controlled automatically as a function of the load.

There are presently known dual-circuit braking systems regulated with load-dependent brake pressure regulators, which are either pure compressed-air brake systems or compressed-air actuated hydraulic brake systems. In these systems, the brake pressure in the brake circuit of the rear axle is regulated as a function of the rear axle load, and the regulation of the brake pressure in the front axle braking circuit is accomplished via a line connection between the regulated rear axle braking circuit and an additional connection on the two-circuit brake valve or tandem master cylinder, whereby the brake pressure of the rear axle brake circuit is regulated as a function of the load and acts on a partial piston surface to which the brake pressure for the front axle braking circuit is applied.

In both cases, the dual-circuit brake pressure controllers possess five line connections so that these braking devices must be connected with five incoming and outgoing lines, namely the two lines from the compressed air source, the two lines to the axle brake circuits and the line from the regulated rear axle braking circuit.

The bulky design of these braking devices and the fact that the pressure lines must join in a confined area require a large amount of space for the assembly relative to the amount of space available in or around the cab.

SUMMARY OF THE INVENTION

The object of the present invention is therefore to devise a dual-circuit braking system in which load-dependent regulation of the two braking circuits possesses the above-cited positive characteristics, but which requires considerably less space for the dual-circuit brake pressure controller actuated by the driver.

This problem is solved by the present invention through the division of the dual-circuit braking system into a hydraulic control part and a pneumatic braking part instead of a dual-circuit brake pressure controller of the known type. The hydraulic control part comprises a driver-operated hydraulic brake control device having a tandem cylinder the dimensions of which are considerably reduced and to which only two control lines are connected. It is of little significance whether a pneumatic braking-power regulator is controlled by direct hydraulic means, as in FIG. 1, or whether a control pressure regulated by a hydraulic braking-power regulator as a function of the load controls a pneumatic relay valve, as in FIG. 2. In the latter case, the relay valve can be installed advantageously as close as possible to the wheel-brake cylinder, so as to achieve minimum brake response times.

Since the hydraulic control of the pneumatic brake-power regulator must be arranged, for functional reasons, at the site on which a so-called precontrol device had been previously installed, it was necessary to determine at the same time how to achieve the precontrol with other means.

The integration of a pressure-limiting valve solves this problem simply, so that a hydraulically-actuated, pneumatic braking-power regulator with automatic load dependence and with a precontrol device was the result.

BRIEF DESCRIPTION OF THE DRAWINGS

The invention shall now be explained in greater detail on the basis of exemplified embodiments represented in the drawings, wherein:

FIG. 4 shows a hydraulically-controlled pneumatic relay valve.

DESCRIPTION AND OPERATION

Figure 1:
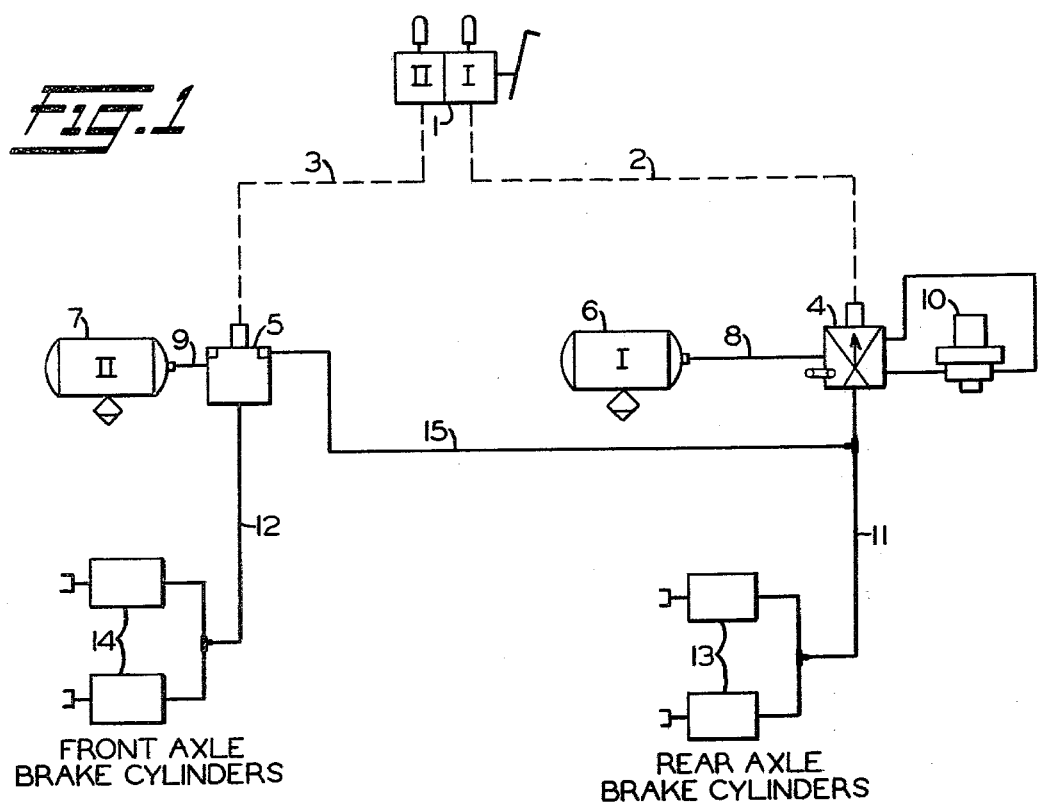
FIG. 1 shows a hydraulically-controlled dual-circuit compressed-air braking system with a hydraulically-controlled penumatic brake pressure regulator in the braking circuit of the rear axle, a hydraulically-controlled pneumatic relay valve in the braking circuit of the front axle and a pneumatic connection between the regulated braking circuit of the rear axle and the braking circuit of the front axle.

In accordance with FIG. 1, hydraulic lines 2 and 3 are associated with a Circuit I and a Circuit II, respectively of the master cylinder 1. Line 2 connects Circuit I, assigned to the rear axle, to a brake-power regulator 4, while line 3 connects Circuit II assigned to the front axle, to a relay valve 5. Both the brake-power regulator 4 and the relay valve 5 are connected with separate compressed-air supply tanks 6 and 7 via lines 8 and 9. Assigned to the brake-power regulator 4 is a pressure limiting valve 10, which may be pre-adjusted to output a certain percentage of the inlet pressure and can either be installed on the braking force regulator 4 or integrated with it. Pneumatic lines 11 and 12 are connected from the braking power regulator 4 and the relay valve 5, respectively, to the wheel brake cylinders 13 of the rear axle or wheel brake cylinders 14 of the front axle. A line 15 connects line 11 with the relay valve 5.

Figure 2:
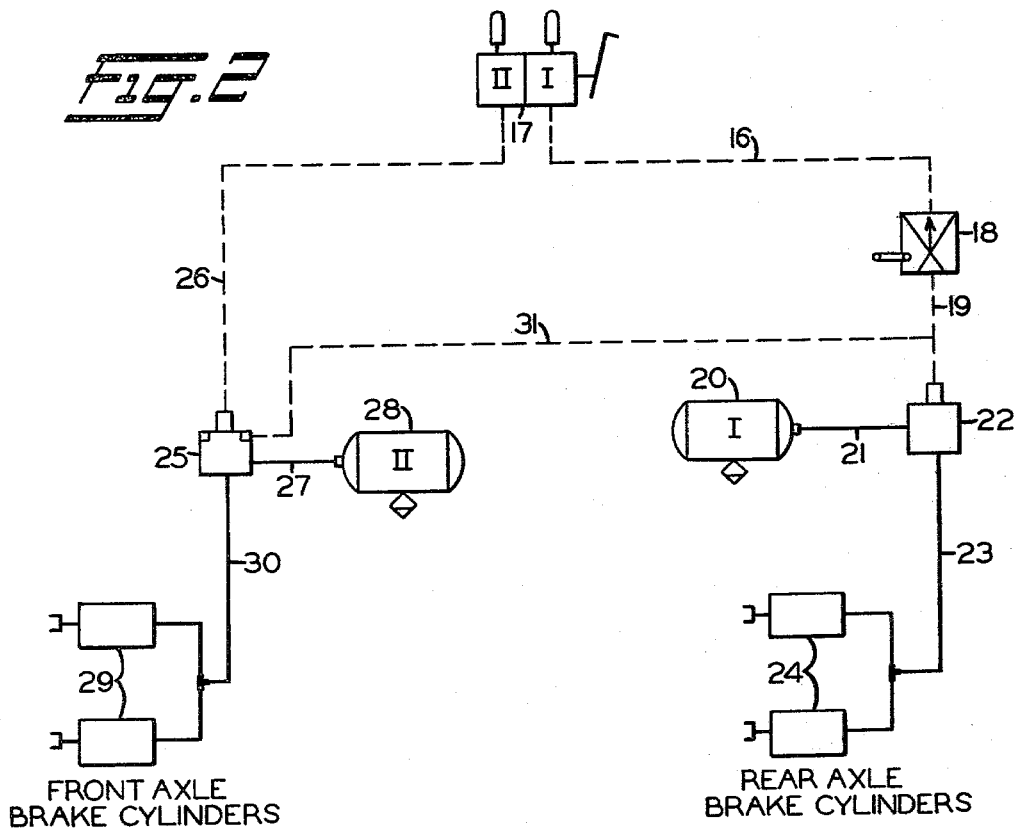
FIG. 2 shows the same braking system as in FIG. 1, but with a hydraulic brake pressure regulator in the braking circuit of the rear axle and an additional pneumatic relay valve, such as in the front axle braking circuit, controlled by the control pressure that is regulated hydraulically, as a function of the load, and a hydraulic connection between the regulated control part of the braking circuit of the rear axle and the braking circuit of the front axle.

In contrast with the braking system shown in FIG. 1, a hydraulic line 16 runs from Circuit I of a master cylinder 17 in FIG. 2 to a hydraulic braking power regulator 18, whose load regulated hydraulic control pressure controls a pneumatic relay valve 22 connected with a compressed-air supply tank 20 via a line 21, which relay valve is connected with the wheel brake cylinders 24 of the rear axle via a line 23. As in FIG. 1, there is a connection between Circuit II of master cylinder 17 and a relay valve 25 via a line 26. Relay valve 25 is also connected with a supply tank 28 via a line 27. The connection between the relay valve 25 and the wheel brake cylinders 29 of the front axle is via a line 30. A hydraulic line 31 connects line 19 and relay valve 25.

Figure 3:
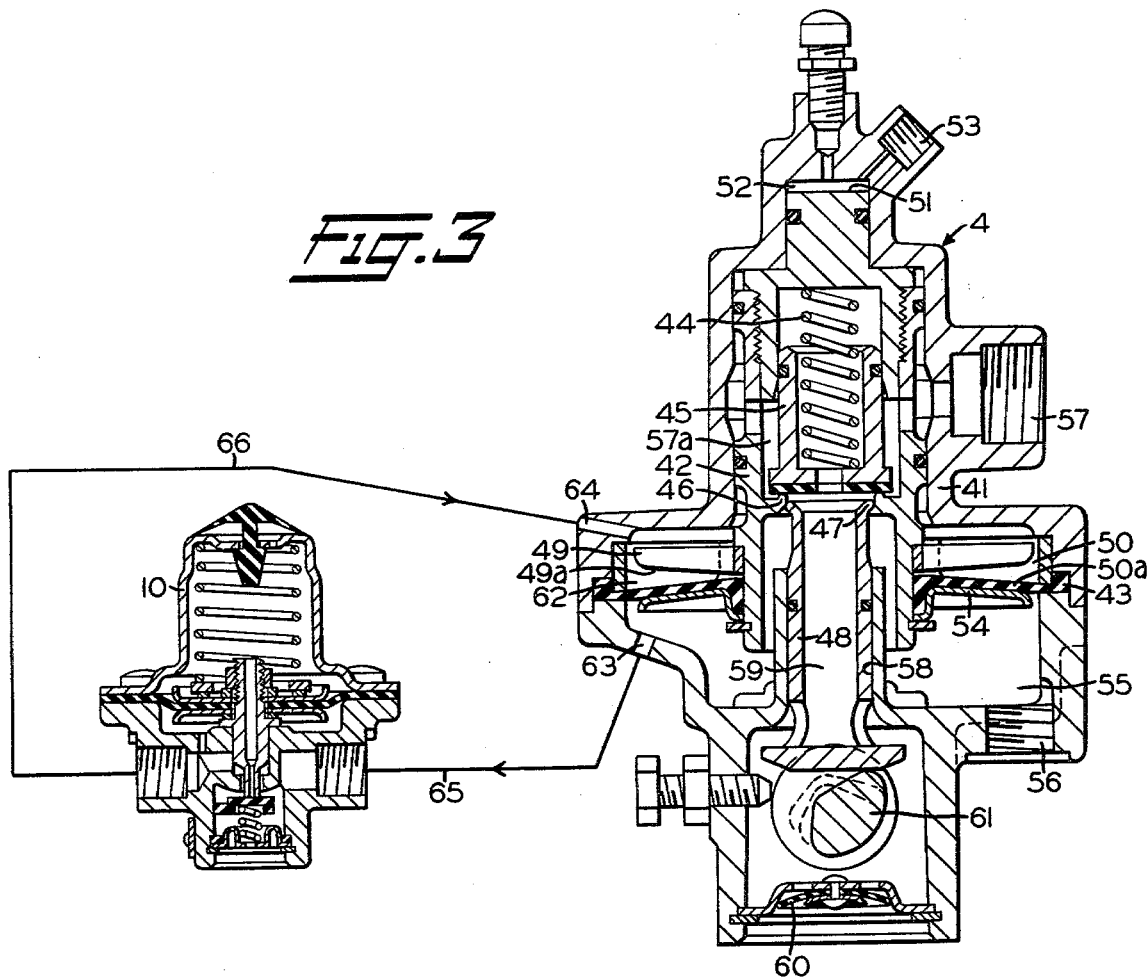
FIG. 3 shows a hydraulically-controlled pneumatic-pressure regulator with a pressure-limiting valve as a precontrol device.

In the braking power regulator 4 shown in FIG. 3, a braking-power regulating piston 42, 43 is arranged in the upper part of the housing 41; it consists of a regulating piston 42 and a diaphragm 43. Within the internal space of the piston is a valve member 45 loaded by a spring 44, which member forms an intake valve 45, 46, with a valve seat 46 arranged on the inside wall of the piston 42, and an exhaust valve 45, 47 with the front surface of a tappet 48 arranged below the double valve member 45 and designed as a valve seat 47. A number of radial ribs 49 are connected with the piston 42, and their end surface 49a facing diaphragm 43 forms part of a conical surface. The housing 41 contains a number of radial stationary ribs 50 in whose interspaces the ribs 49 extend without making contact, and whose front surfaces 50a facing diaphragm 43 form parts of a conical surface.

In the position illustrated in the Figure, diaphragm 43 lies against these front surfaces 50a.

Diaphragm 43 is attached with the inside of the housing at its outside edge and with the piston 42 at its inside edge. In this way, the braking pressure regulating piston 42, 43 is formed with an upper unchanging effective pressure area 51, which is part of a control chamber 52 situated over piston 42; this control chamber is connected with the hydraulic connection 53, which provides the connection to Circuit I of the tandem master cylinder in FIG. 1. The braking-pressure regulating piston 42, 43 also has a bottom effective area 54, which changes with axial motion of the piston 42 and is part of a chamber 55 situated below diaphragm 43; this chamber is provided with a connection 56 that leads to the brake cylinders and is also connected via the opened intake valve 45, 46 and a supply chamber 57a with a compressed-air connection 57 leading to a compressed-air tank.

The partially-hollow tappet 48 is guided in a central bore 58 of the housing, its upper front surface—mentioned above—forms the escape valve seat 47, and its hollow space 59 is relieved by an atmospheric connection 60. The tappet 48 is connected operationally with a cam plate or a cam 61, whose position is a function of the vehicle weight or axle load. A shaft (not shown) may be connected between the cam plate 61 and the vehicle axle via a lever and a connecting rod with a metal bellows, none being shown, as this is a conventional, well-known arrangement for load brake control.

The pressure-limiting valve 10, which forms the pre-control device is also conventional and is connected via connections 63, 64 and lines 65, 66 between the chamber 55 below the diaphragm 43 and the chamber 62 above this diaphragm 43.

In the relay valve 5 shown in FIG. 4, a regulating piston 71 is arranged in the upper part of the housing 70, and its bottom front surface 72 forms an exhaust valve 72, 73 with the top front surface 73 of a double valve member 75 to which upward tension is applied by a spring 74; the exhaust from this valve passes into the atmosphere via a bore 76 in the double valve body 75 and an exhaust connection 77. With an annular surface 78 and a stop 79 designed as a valve seat attached to the housing, the double valve member 75 forms an intake valve 78, which provides a connection via a housing chamber 82 between an intake connection 80 connected with the compressed-air source and a delivery connection 81 connected with the brake cylinders.

The regulating piston 71 has a top effective pressure area 83, which is part of a control chamber 84 situated above this piston 71; this control chamber is communicated with Circuit II of the master cylinder via a hydraulic connection 85. A second effective pressure area 86, designed as an annular surface on the piston 71, and whose direction of action is the same as that of the area 83, forms the part of an annular chamber 87 that is connected with the load-dependent control pressure of the rear axle brake circuit via a pressure connection 88.

The function of the braking system shown in FIG. 1 is as follows: When the driver actuates the tandem master cylinder 1, the braking-power regulator is operated hydraulically via line 2 so that the resulting opening of the valve admits compressed air from the tank 6 into the brake cylinder 13 of the rear axle via line 11. The regulation of the compressed air flowing into the brake cylinder 13 as a function of the load due to the braking force regulator 4 is explained in detail in the following in a functional description of the braking-power regulator, and the function of the pressure limiting valve 10 is explained in detail.

With the actuation of the tandem master cylinder 1, the relay valve 5 is simultaneously actuated via line 3, and compressed air flows out of container 7 into the brake cylinders 14 of the front axle through the opening valve. Via line 15, which connects the two brake circuits, the relay valve 5 is affected by the compressed air of the rear axle that is regulated as a function of the load.

Details about the function of the relay valve 5 are given in the following.

In the braking system illustrated in FIG. 2, actuation of the tandem master cylinder 17 operates hydraulic braking-power regulators 18 in the braking system of the rear axle; this braking-power regulator supplies hydraulic control pressure to the relay valve 22, as a function of the load; the function of this valve is the same as that of the relay valve in the front axle brake circuit of FIG. 1. The relay valve 25 also performs this function.

The function of the braking-power regulator shown in FIG. 3 is as follows:

The hydraulic control pressure obtained from the tandem master cylinder passes through the connection 53 into the control chamber 52, acts on the top side 51 of the piston 42, 43 and depresses it. The double valve body 45 follows this motion under the influence of the spring 44, comes to rest on the front surface of tappet 48, which is designed as a valve seat 47, thereby closing the escape valve 45, 47 and opening intake valve 45, 46 as piston 42 travels further downward. Compressed air then flows out of the supply tank via connection 57 into chamber 57a through the open valve 45, 46 and through the connection 56 into the brake cylinders, while at the same time the pressure in chamber 55 is connected to chamber 62 above diaphragm 43 via limiting valve 10. During the downward movement of the piston 42, diaphragm 43 is released from the ribs 50 in housing 41 and is applied increasingly to the ribs 49 of piston 42. The active diaphragm surface is therefore continuously enlarged until the force acting on the bottom side of the piston exceeds the force acting on its top side. In this way, the piston 42 is raised again, and valve 45, 46 is closed. A brake-closure position is reached. The pressure then prevailing in the brake cylinders corresponds to the pressure regulated as a function of the axle loading weight. Only in the fully loaded position 1:1 does the intake 45, 46 remain open. The pressure then measurable in the brake cylinders of the fully loaded vehicle is equivalent to the pressure sent from the tandem master cylinder into the braking-power regulator; when the vehicle is partially loaded or empty, this pressure decreases proportionally.

Via the connection between the two chambers 55 and 62 above and below the diaphragm piston 43 via the pressure-limiting valve 10, suppression of the load adjusted braking process during light brake applications is achieved by the pressure acting on the top side of the diaphragm 43; this is accomplished as a function of the setting of the pressure-limiting valve 10.

The function of a pressure-limiting valve is known and will not be discussed here in further detail.

After the brake pressure subsides, the pressure fluid in the brake cylinders pushes the piston 42 into its upper end position and exhausts through the opening provided by exhaust valve 45, 47 through the bore 59 in the tappet 48 and through the connection 60 to the atmosphere.

The function of the relay valve shown in FIG. 4 is as follows:

The hydraulic control pressure supplied by the tandem master cylinder passes through connection 85 into chamber 84 and depresses piston 71. At the same time, the load-dependent pneumatic brake pressure or hydraulic control pressure passes from the braking-power regulator into annular chamber 87 via connection 88 and acts in the same direction as the pressure in chamber 84. The downward motion of piston 71 closes the discharge valve 72, 73 and opens the intake valve 78, 79, and supply air flows from the connection 80 into the series-connected brake cylinders via connection 81.

At the same time, a pressure acting on the bottom side 72 of the piston 71 builds up in chamber 82 as soon as this pressure becomes somewhat greater than the pressure in chamber 84, the piston 71 travels upward and closes intake 78, 79. A closure position is reached.

After the control pressure at connection 85 is released, the pressure in chamber 82 raises piston 71 and opens discharge 72, 73. The brake cylinders are relieved partially or completely in accordance with the pressure drop at connection 85.

I claim:

1. In a fluid pressure brake system for a wheeled vehicle having first and second axles, there is provided separate brake control circuits for said first and second axles via which fluid brake control pressure is conducted in accordance with operation of a brake valve device common to said separate brake control circuits, wherein the invention comprises:
   (a) said common brake valve device having an output via which hydraulic pressure is connected to a respective one of said separate brake control circuits;
   (b) pneumatic brake cylinders in each said separate brake control circuit;
   (c) relay valve means in each said separate brake control circuit for connecting a source of compressed air to said pneumatic brake cylinders of a respective one of said brake control circuits, each said relay valve means having a control input connected to a respective one of said outputs of said brake valve device and an output connected to a respective one of said pneumatic brake cylinders, said relay valve means in brake control circuit of said first axle being regulated in accordance with the load condition at said first axle to accordingly adjust the pneumatic pressure of said brake cylinder of said first axle; and
   (d) said relay valve means in said brake control circuit of said second axle having a further control input to which said load adjusted pneumatic brake cylinder pressure of said first axle is connected, whereby the pneumatic pressure at said brake cylinders of said second axle is adjusted according to the load condition at said first axle.

2. In a fluid pressure brake system for a wheeled vehicle having first and second axles, there is provided separate brake control circuits for said first and second axles via which fluid brake control pressure is conducted in accordance with operation of a brake valve device common to said separate brake control circuits, wherein the invention comprises:
   (a) said common brake valve device having an output via which hydraulic pressure is connected to a respective one of said separate brake control circuits;
   (b) pneumatic brake cylinders in each said separate brake control circuit;
   (c) relay valve means in each said separate brake control circuit for connecting a source of compressed air to said pneumatic brake cylinders of a respective one of said brake control circuits;
   (d) said relay valve means of said brake control circuit of said first axle comprising:
      (i) a first relay valve having a first control input connected to said hydraulic pressure output of said brake valve device connected to said brake control circuit of said first axle, an output to which hydraulic fluid pressure is connected from said control input, and means for adjusting the hydraulic fluid pressure at said output of said first relay valve in accordance with the vehicle load condition at said first axle; and
      (ii) a second relay valve having a second control input to which said load adjusted hydraulic fluid pressure at said output of said first relay valve is connected, and an output via which said source of compressed air connected to said pneumatic brake cylinders in said brake control circuit of said first axle is adjusted according to the load condition at said first axle;
   (e) said relay valve means of said brake control circuit of said second axle having a third control input connected to said hydraulic pressure output of said brake valve device in said brake control circuit of said second axle, an output via which said source of compressed air is connected to said pneumatic brake cylinders in said brake control circuit of said second axle, and a fourth control input to which said load adjusted hydraulic pressure at said output of said first relay valve is connected, whereby the pneumatic pressure at said brake cylinders of said second axle is adjusted according to the load condition of said first axle.

3. A fluid pressure brake system as recited in claim 1, wherein said relay valve means in said brake control circuit of said first axle comprises:
   (a) valve means for controlling the delivery of fluid pressure from said source of compressed air to said pneumatic brake cylinders in said brake control circuit of said first axle;
   (b) pressure responsive regulating piston means for actuating said valve means;
   (c) pressure responsive reaction piston means subject to the fluid pressure delivered to said brake cylinders in said brake control circuit of said first axle for providing a counter force on said valve means to terminate said delivery of fluid pressure to said brake cylinders when a force balance is established between said pressure responsive regulating piston means and said pressure responsive reaction piston means, said pressure responsive reaction piston means having an effective pressure area on one side thereof that varies with the position of said valve means; and (d) load responsive means for establishing the position of said valve means according to the load condition of said vehicle at said first axle.

4. A fluid pressure brake system as recited in claim 3, further characterized in that said pressure responsive regulating piston means is subject to said hydraulic fluid pressure in said brake control circuit of said first axle.

5. A fluid pressure brake system, as recited in claim 3 or 4, further comprising a pressure limiting valve device having an inlet to which said pneumatic brake cylinder pressure acting on said one side of said pressure responsive reaction piston is connected, and an outlet via which a preselected percentage of said inlet fluid pressure is connected to the side of said pressure responsive reaction piston opposite said one side.

6. A fluid pressure brake system, as recited in claim 1, wherein said relay valve means in said brake control circuit of said second axle comprises:

(a) valve means for controlling the delivery of fluid pressure from said source of compressed air to said pneumatic brake cylinders in said brake control circuit of said second axle; and (b) regulating piston means having a first effective pressure area subject to said hydraulic fluid pressure in said brake control circuit of said second axle for actuating said valve means and a second effective pressure area in opposing relationship with said first effective pressure area subject to the fluid pressure delivered to said brake cylinders to terminate said delivery of fluid pressure to said brake cylinder when a force balance exists across said regulating piston means.

7. A fluid pressure brake system as recited in claim 6, further characterized in that said regulating piston means includes a third effective pressure area subject to said load adjusted pneumatic brake cylinder pressure connected to said further control input, said third effective pressure area being in opposed relationship with said second effective pressure area.

8. A fluid pressure brake system, as recited in claim 11, wherein said relay valve means in said brake control circuit of said second axle comprises:

(a) valve means for controlling the delivery of fluid pressure from said source of compressed air to said pneumatic brake cylinders in said brake control circuit of said second axle; and (b) regulating piston means having a first effective pressure area subject to said hydraulic fluid pressure in said brake control circuit of said second axle for actuating said valve means and a second effective pressure area in opposing relationship with said first effective pressure area subject to the fluid pressure delivered to said brake cylinders to terminate said delivery of fluid pressure to said brake cylinder when a force balance exists across said regulating piston means.

9. A fluid pressure brake system, as recited in claim 8, further characterized in that said pressure responsive regulating piston means includes a third effective pressure area subject to said load adjusted hydraulic pressure connected from said output of said first relay valve to said fourth control input, said third effective pressure area being in opposed relationship with said second effective pressure area.

* * * * *

UNITED STATES PATENT AND TRADEMARK OFFICE
CERTIFICATE OF CORRECTION

PATENT NO. : 4,300,805
DATED : November 17, 1981
INVENTOR(S) : Erich Reinecke

It is certified that error appears in the above-identified patent and that said Letters Patent are hereby corrected as shown below:

Column 8, line 11, delete "11" and insert --2--

Signed and Sealed this

Ninth Day of November 1982

[SEAL]

Attest:

GERALD J. MOSSINGHOFF

Attesting Officer    Commissioner of Patents and Trademarks